(12) United States Patent
Hamilton

(10) Patent No.: US 9,395,029 B2
(45) Date of Patent: Jul. 19, 2016

(54) INFLATABLE APPARATUS FOR HOLDING A DEVICE

(76) Inventor: James Hamilton, Monmouthsire (GB)

( * ) Notice: Subject to any disclaimer, the term of this patent is extended or adjusted under 35 U.S.C. 154(b) by 0 days.

(21) Appl. No.: 13/699,372

(22) PCT Filed: Feb. 3, 2011

(86) PCT No.: PCT/GB2011/050181
§ 371 (c)(1),
(2), (4) Date: Dec. 21, 2012

(87) PCT Pub. No.: WO2011/148151
PCT Pub. Date: Dec. 1, 2011

(65) Prior Publication Data
US 2013/0200226 A1 Aug. 8, 2013

(30) Foreign Application Priority Data
May 24, 2010 (GB) .................................. 1008605.6

(51) Int. Cl.
*A45D 19/04* (2006.01)
*F16M 11/00* (2006.01)
*A61H 19/00* (2006.01)

(52) U.S. Cl.
CPC ............... *F16M 11/00* (2013.01); *A61H 19/00* (2013.01); *A61H 2201/0103* (2013.01); *A61H 2201/0192* (2013.01)

(58) Field of Classification Search
CPC ................. F16M 11/00; A61H 19/00; A61H 2100/0103; A61H 2101/0192
USPC ............................................. 248/127; 600/38
See application file for complete search history.

(56) References Cited

U.S. PATENT DOCUMENTS

| | | | | |
|---|---|---|---|---|
| 5,005,702 A * | 4/1991 | Davis | ..................... | B60N 3/002 108/43 |
| 5,134,930 A * | 8/1992 | Mei-Hwa | ........................ | 100/42 |
| 5,476,404 A * | 12/1995 | Price | ............................. | 441/131 |
| 5,556,258 A * | 9/1996 | Lange et al. | .................... | 417/63 |
| 5,580,132 A * | 12/1996 | Rediske | ................... | 297/452.41 |
| 5,851,175 A * | 12/1998 | Nickell | .......................... | 600/38 |
| 6,038,719 A * | 3/2000 | Castagna | ......................... | 5/636 |
| 6,302,364 B1* | 10/2001 | Chiueh | ...................... | 248/311.2 |
| 6,491,179 B2* | 12/2002 | Dokun | ........................ | 220/560 |
| 6,637,617 B2* | 10/2003 | Eisenbraun et al. | ......... | 220/720 |
| 6,823,801 B2* | 11/2004 | Lieberman | ..................... | 108/25 |

(Continued)

FOREIGN PATENT DOCUMENTS

DE 202006015550 U1 2/2007
DE 102006015201 * 10/2007

(Continued)

OTHER PUBLICATIONS

International Search Report dated Aug. 3, 2011, by Authorized Officer Nikolaus Knoflacher.

*Primary Examiner* — Kimberly Wood

(57) ABSTRACT

An inflatable apparatus, for use in supporting a device such as a sex toy, the inflatable apparatus comprising: an inflatable portion which serves as a main structural element of the apparatus; a holding portion which extends into the inflatable portion, and which defines a holding aperture bounded by a holding surface, the holding surface being adapted for frictional engagement with a device inserted into the holding aperture, wherein the holding portion is adjustable such that such frictional engagement can be adjusted.

16 Claims, 5 Drawing Sheets

(56) References Cited

U.S. PATENT DOCUMENTS

| | | | |
|---|---|---|---|
| 7,273,460 B1* | 9/2007 | Nan | 601/98 |
| 7,300,104 B1* | 11/2007 | Hagedorn | 297/158.3 |
| 7,992,502 B1* | 8/2011 | Davis | 108/43 |
| 8,413,277 B2* | 4/2013 | Davis et al. | 5/710 |
| 8,413,960 B2* | 4/2013 | Davis | 254/93 HP |
| 8,911,349 B2* | 12/2014 | Jackson | A61H 19/00 600/38 |
| 2001/0038798 A1* | 11/2001 | Foster | 417/478 |
| 2004/0211004 A1* | 10/2004 | Thompson | 5/655.3 |
| 2005/0166326 A1* | 8/2005 | Chaffee | 5/655.3 |
| 2007/0106110 A1* | 5/2007 | Hollingsworth et al. | 600/38 |
| 2007/0213772 A1* | 9/2007 | Cianfrani | A61H 19/34 607/2 |
| 2008/0028534 A1* | 2/2008 | Wilkinson | 5/713 |
| 2009/0036806 A1* | 2/2009 | Nan | 601/49 |
| 2011/0054251 A1* | 3/2011 | Staffolani | 600/41 |
| 2011/0270033 A1* | 11/2011 | Jackson | 600/38 |
| 2013/0221181 A1* | 8/2013 | Hamilton | 248/523 |

FOREIGN PATENT DOCUMENTS

| | | |
|---|---|---|
| GB | 2431585 A | 5/2007 |
| WO | WO-2009003243 A1 | 1/2009 |

* cited by examiner

INFLATABLE APPARATUS FOR HOLDING A DEVICE

The present invention relates to inflatable apparatus, in particular for use holding an object such as a sex toy.

It is common for objects, in particular interactive equipment such as toys, to be supported for use in a hands free manner. Such hands free support enables the person interacting with the toy to have more freedom of movement and the ability to interact in a variety of ways without the restriction of at least one of their hands holding the toy. With sex toys in particular, the ability to use the toy in a hands free manner can increase the enjoyment and sexual satisfaction derived from the toy.

Sex toys may be used by one person for providing pleasure to another person. Existing support arrangements for sex toys in this case typically include strap arrangements which enable one person to attach the toy to their body and use it for providing pleasure to their partner. Alternatively a sex toy may be used by a person, when alone, for providing their own pleasure. If the person is alone, they may use the straps to secure the toy at a particular location on their own body, however this means that the toy is located in a stationary position. Alternatively they could use the straps to attach the toy to a suitable surface or object so that they can obtain hands free pleasure from the toy. However, such strap arrangements usually retain the toy in a rigid position, which may make movement relative to the toy may be difficult or uncomfortable.

Therefore, there is a need for a hands free support for use with sex toys which can be used by one or more person which supports the toy in a way which facilitates varied and comfortable interaction with the toy. Such hands free support apparatus may be of particular use for men suffering mobility problems who are unable to support themselves in the missionary position or unable to kneel or stand comfortably for a long enough period to pleasure their partner.

It is therefore an object of the present invention to obviate or mitigate at least one of the aforementioned problems.

According to a first aspect of the present invention there is provided an inflatable apparatus comprising: an inflatable portion which serves as a main structural element of the apparatus; a holding portion which extends into the inflatable portion, and which defines a holding aperture bounded by a holding surface, the holding surface being adapted for frictional engagement with a device inserted into the holding aperture, wherein the holding portion is adjustable such that such frictional engagement can be adjusted.

The provision of an inflatable apparatus having a holding portion which retains a device by frictional engagement means that the device will be supported by a pliant apparatus thus increasing comfort for a user interacting with the device. As the holding portion is adjustable, the apparatus will be able to accommodate devices of various cross-sectional diameters and shapes.

Preferably, the holding portion is selectively inflatable.

A selectively inflatable holding portion will enable the device to be retained in a non-rigid manner.

Conveniently, the holding portion is substantially tubular. The tubular holding portion may have a circular cross-section. However, it will be appreciated that the holding portion may have any other suitable cross-sectional shape including, but not limited to, square, rectangular, triangular or oval.

Preferably at least one part of the substantially tubular holding portion is provided with substantially planar walls.

The inflatable apparatus may be provided with at least one valve to facilitate inflation and deflation. However, the inflatable apparatus may be provided with two or more valves to facilitate inflation and deflation. The inflatable portion may be provided with at least one valve and may be provided with two valves to facilitate inflation and deflation.

A first valve will facilitate general inflation and deflation; a second valve may be used to make minor adjustments to the level of inflation.

The holding portion is preferably provided with a hand activated pump to facilitate selective inflation and deflation.

In one embodiment, the inflatable apparatus further comprises a retaining portion that extends from an inner edge region of the holding portion in a non-linear manner with respect to the holding aperture, the retaining portion being adapted to retain flexibly, in at least one direction, a device inserted into the holding aperture.

The extending of the retaining portion in a non-linear manner enables a device inserted into the holding portion to be retained within the retaining portion until secured by frictional engagement.

In another embodiment, the inflatable apparatus further comprises a holding surface that extends across the holding aperture at an inner edge region of the holding portion, the holding surface being adapted to retain flexibly, in at least one direction, a device inserted into the holding aperture.

The incorporation of a holding surface enables devices of very slim construction or malleable construction to be retained in the holding portion until secured by frictional engagement.

In a third embodiment, the inflatable portion may be a first inflatable portion and the inflatable apparatus may further comprising a second inflatable portion, located within the first inflatable portion, which serves as a secondary structural element of the inflatable apparatus.

The second inflatable portion, provided within the first inflatable portion will, when inflated, provided extra stability and support to the inflatable apparatus.

The second inflatable portion is preferably provided with at least one valve to facilitate inflation and deflation. A first valve will facilitate general inflation and deflation, a second valve may be used to make minor adjustments to the level of inflation.

Embodiments of the present invention will now be provided, by way of example only, and with reference to the following figures, in which.

Throughout the description the same reference numerals will be used in each Figure to refer to components which are substantially the same.

Figure 1:
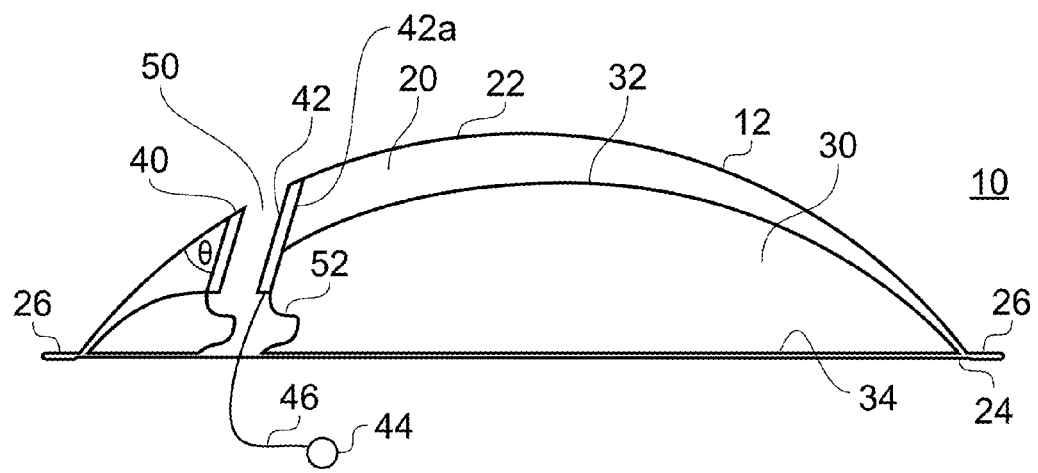
FIG. 1 is a cross-sectional view from the side of an inflatable apparatus according to a first embodiment of the present invention.

With reference to FIG. 1 there is provided an inflatable apparatus 10 comprising an inflatable body 12 having a first inflatable portion 20, a second inflatable portion 30 and a holding portion 40. The first inflatable portion 20 has first surface 22 and second surface 24 which are bonded together at bonded edge 26 to provide airtight inflatable portion 20.

The second inflatable portion 30 is defined by third surface 32 and a fourth surface 34 which are bonded together between first surface 22 and second surface 24 at bonded edge 26 to provide an airtight inflatable portion 30. The second inflatable portion 30 is located within the first inflatable portion 20. The first surface 22 substantially defines an arc, the second surface 24 is substantially planar. The third surface 32 substantially defines and arc, the fourth surface 34 is substantially planar and lies parallel to and adjacent second surface 22. Holding aperture 50 has an aperture wall 52 defined through the body 12 from first surface 22 to second surface 24 through an appropriately shaped aperture (not shown), defined between the third surface 32 and fourth surface 34. A holding portion 40 extends along holding aperture 50 into the inflatable body 12 from first surface 22. The holding portion 40 is bounded by a holding surface 42 with outer holding surface 42a affixed to aperture wall 52. The holding portion 40 is inflatable and is connected to a hand pump 44 by tube 46 entering the body 12 through holding aperture 50 at second surface 24. Aperture wall 52 extends beyond the extent of holding portion 40 to second surface 24. Between holding portion 40 and second surface 24 the aperture wall 52 can be seen to define a non-linear, corrugated wall surface which acts to prevent a device (not shown), when inserted into holding aperture 50 from first surface 22, from slipping through holding aperture 50 and exiting at the second surface 24. Furthermore, the corrugated profile of aperture wall 52 acts to provide a cushioning effect when pressure is applied at the first surface 22 to a device (not shown) retained in holding portion 40

The holding surface 42 is adapted such that, upon inflation, frictional engagement occurs with a device (not shown), such as a dildo, inserted into the holding aperture 50 at the first surface 22. As the holding portion 40 is adjustable, the apparatus 10 will be able to accommodate devices of various cross-sectional diameters and shapes.

Figure 2:
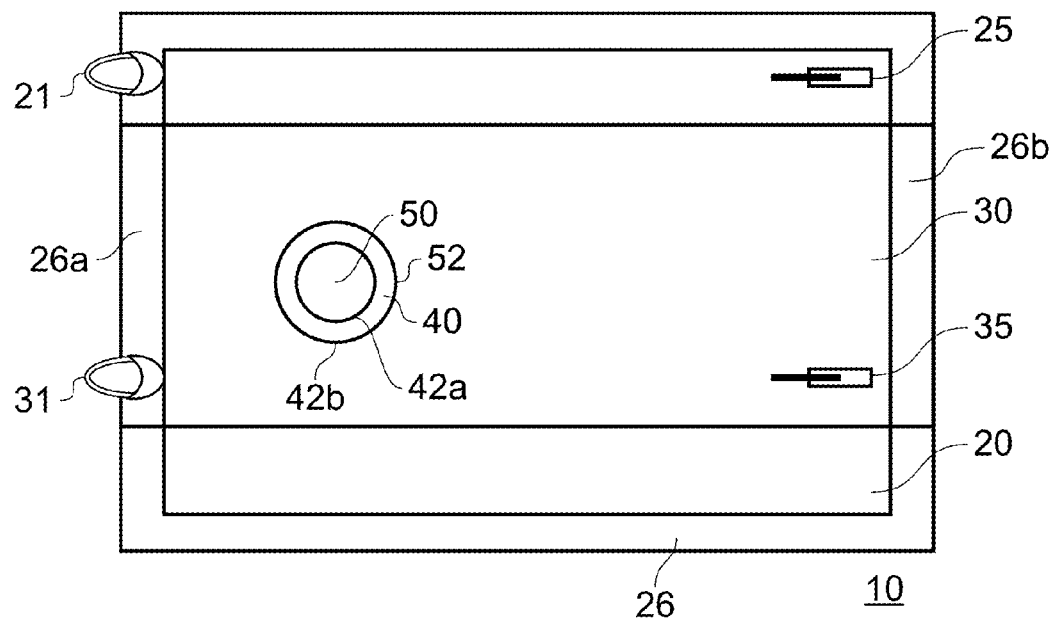
FIG. 2 is a cross sectional plan view of the inflatable apparatus shown in FIG. 1.

With reference to FIG. 2 there can be seen a plan view of the inflatable apparatus 10 of FIG. 1. The apparatus 10 has a rectangular shaped footprint defined by the first inflatable portion 20 of the inflatable body 12. Bonded edge 26 is provided around the perimeter of the first inflatable portion 20 providing an airtight seal. The first inflatable portion 20 is provided with a first main valve 21 which enables inflation and deflation of inflatable portion 20. The first inflatable portion 20 is further provided with a first fine tuning valve 25. Fine tuning valve 25 enables a user to adjust the inflation of the inflatable portion 20 of the inflatable body 12 by small degrees of pressure until a desired cushioning effect is obtained. Holding aperture 50 has an aperture wall 52. Holding portion 40 is located within holding aperture 50 and bounded by a holding surface 42 with outer holding surface 42a affixed to aperture wall 52 and inner holding surface 42b which will, in use, frictionally engage with a device (not shown). In this embodiment, the holding surface 42 of the apparatus is formed as a double skinned wall having air therebetween, however alternative suitable wall construction could be used to provide the holding surface 42. The second inflatable portion 30 of the inflatable body 12 is located within the first inflatable portion 20 and is bonded at edges 26a and 26b to provide inflatable portion 30 with an airtight seal. The second inflatable portion 30 is provided with a second main valve 31 which enables inflation and deflation of inflatable portion 30. The second inflatable portion 30 is further provided with a second fine tuning valve 35 thus enabling a user to adjust the inflation of the inflatable portion 30 of the inflatable body 12 by small degrees of pressure until a desired cushioning effect is obtained.

Figure 3A:
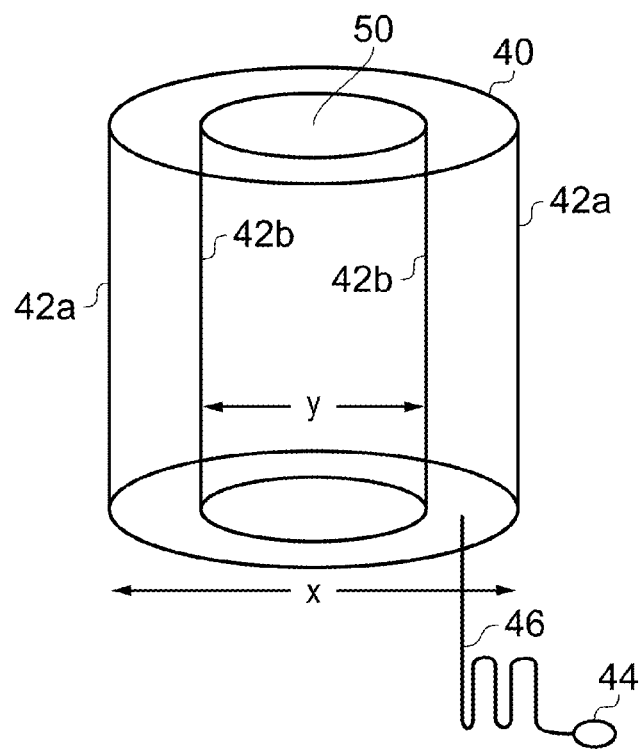
FIG. 3A is a cross-sectional view from the side of a holding portion, shown in an un-inflated state, of the inflatable apparatus of FIG. 1.
Figure 3B:
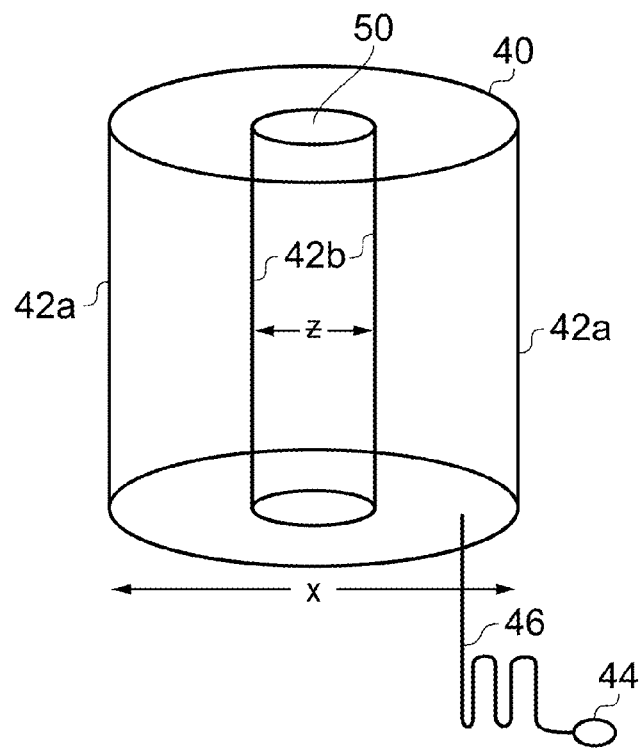
FIG. 3B is a cross-sectional view from the side of the holding portion of FIG. 3 in an inflated state.

As can be seen in FIG. 3A, the holding portion 40 defines an annular cylinder which is bounded by a holding surface 42b. Hand pump 44 is connected to the holding portion 40 by tube 46. In FIG. 3A the holding portion 40 is shown in an un-inflated state wherein the outer surface 42a has a cross-sectional diameter x and inner surface 42b has a cross-sectional diameter y. In FIG. 3B, the holding portion 40 is shown in an inflated state and as can be seen, the outer surface 42a maintains substantially the same diameter x before and after inflation however inner surface 42b has a diameter z wherein z<y.

In one example of the embodiment illustrated in FIGS. 1, 2 3A and 3B, the inflatable apparatus measures approximately 900 m from bonded edge 26a at which the first main valve 21 is located to the opposing bonded edge 26b. The bonded edge 26 will be between 30 mm and 50 mm wide. The centre point of holding aperture 50 on first surface 22 is located 270 mm from bonded edge 26a. The angle θ formed between first surface 22 and holding aperture 50 is 45°.

During use, the first inflatable portion 20 of inflatable body 12 is inflated via main valve 21 with any fine adjustment to pressure being made via fine tuning valve 25 until a desired degree of inflation is achieved. The second inflatable portion 30 may then, if desired, be inflated via main valve 31 with any fine adjustment to pressure being made via fine tuning valve 35 until a desired degree of inflation is achieved. The inflation of the second inflatable portion 30 within the inflated first inflatable portion 20 will provide the inflatable body 12 with extra stability and during use, will provide a "rib-cage" support effect. A device (not shown), in this case a sex toy such as a dildo, is inserted into holding aperture 50 where it comes to rest against the non-linear or corrugated section of aperture wall 52. Holding portion 40 is inflated using hand pump 44 until frictional engagement is achieved between the toy (not shown) and the inner holding surface 42b. The inflatable apparatus 10 can then be secured to a desired surface (not shown) using a strapping arrangement (not shown) affixed to the apparatus 10 and used as desired. In this embodiment, the toy will be retained in holding aperture 50 such that the toy will project from the holding aperture 50 substantially in the direction of rise of the arc of first surface 22. For use by a person to provide pleasure to their partner, the apparatus 10 could be attached to a part of the person's body by a strapping arrangement (not shown). It will be appreciated that any suitable strapping arrangement which would secure the apparatus could be used and this could be provided separately to the apparatus 10 or be integral with the apparatus 10. When the apparatus 10 is being used by a person for their own pleasure, the apparatus 10 could be attached by a strapping arrangement (not shown) to objects such as a pillow or a seat. A particular benefit of the inflatable apparatus is that the inflatable holding portion 40 can be inflated to accommodate toys of varying shapes and sizes.

Figure 4:
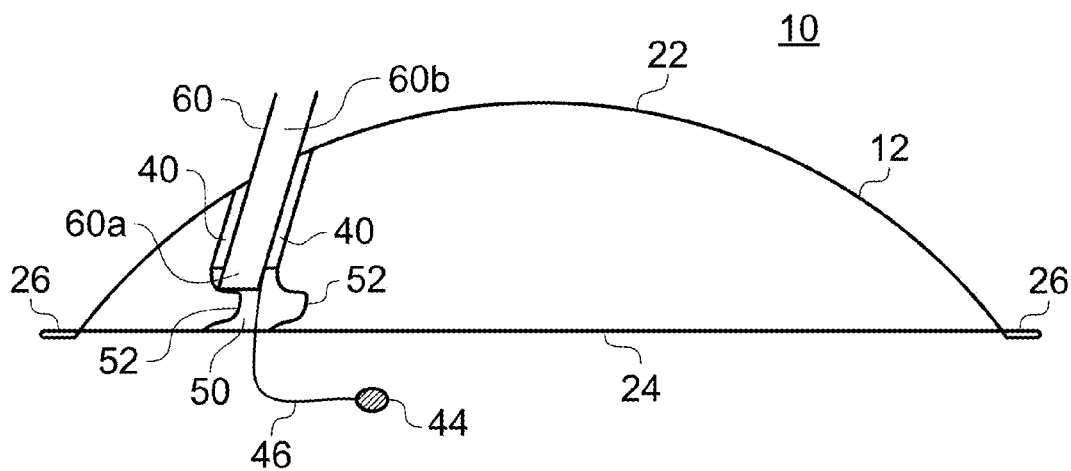
FIG. 4 is a cross-sectional view from the side of the inflatable apparatus of FIG. 1 holding a toy.

FIG. 4 illustrates an example of the apparatus 10 of the above embodiment retaining a toy 60. As can be seen, the base of the toy 60a is located and retained in the holding aperture 50 with the body of the toy 60b projecting from the aperture away from first surface 22.

Figure 5:
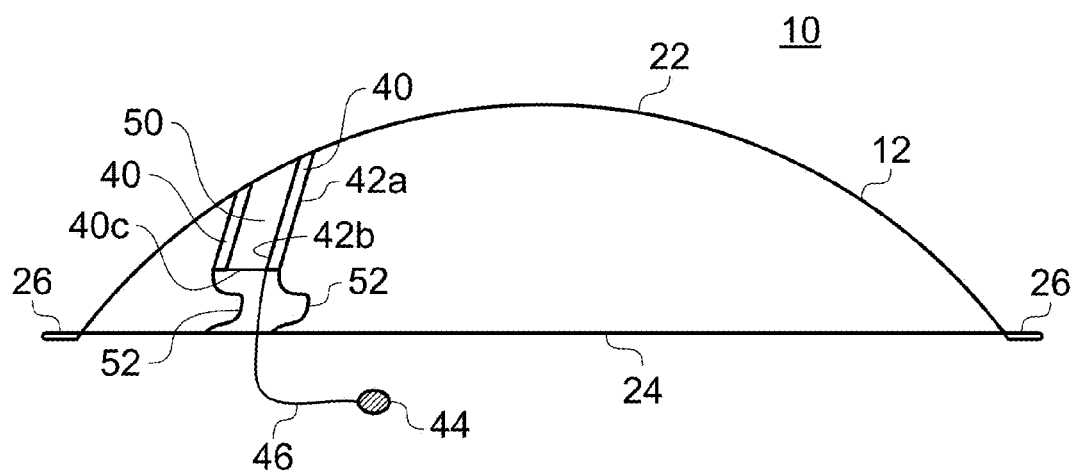
FIG. 5 is a cross-sectional view from the side of an inflatable apparatus according to a second embodiment of the invention.

FIG. 5 illustrates a second embodiment of the inflatable apparatus 10. In this embodiment, the holding portion 40 defines an annular cylinder which is bounded by a holding surface 42 long with the addition of a retention surface 43 which extends across the holding aperture 50 at the interior end 42c of the holding portion 40. This embodiment of the inflatable apparatus 10 will be of particular use to retain toys (not shown) of a slim diameter or malleable construction which could otherwise slip past the corrugations of aperture wall 52 and exit from the apparatus 10 prior to the holding portion 40 being inflated to ensure frictional engagement is achieved. The corrugations of aperture wall 52 would continue to provide cushioning during use of the toy (not shown).

Figure 6A:
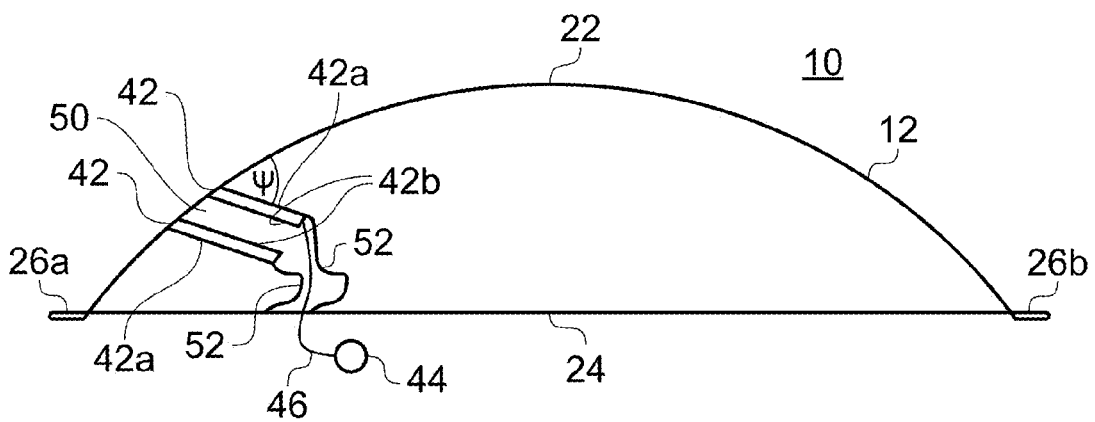
FIG. 6A is a cross-sectional view from the side of an inflatable apparatus according to a third embodiment of the invention.

With reference to FIG. 6A, there is shown a third embodiment of inflatable apparatus 10. As can be seen, in this embodiment, the holding portion 40 is arranged such that a device (not shown) retained within the holding portion 40 will project in a direction away from the rise of the curve of the arc of first surface 22. It will be understood that whilst this embodiment has been illustrated showing only a first inflatable portion 20, the inflatable body may be provided with a second inflatable portion (not shown) as illustrated in the embodiment of FIG. 1.

During use, a toy (not shown) would be located and frictionally engaged in holding aperture 50 as before. In this embodiment, the toy would project from the holding aperture 50 substantially in the direction of bonded edge 324a. This embodiment may be of particular use, by men, for example in the case of erectile dysfunction, wherein the inflatable apparatus 10 could be worn around a man's thigh allowing his partner the pleasure of penetration while also affording both partners intimacy and closeness. In addition this embodiment may also be used as a male masturbatory toy. During use for such a purpose, no device or toy would be retained in the holding portion and the inflatable apparatus could arranged upon a suitable surface.

The inflatable member 10 may also be used by men without being worn on the thigh. In such an embodiment, a male masturbatory sleeve toy may be received within holding aperture 50. The male masturbatory sleeve toy would then be held in position by inflatable apparatus 10 such that the male user may access the male masturbatory sleeve toy in a hands-free manner for sexual pleasure.

In one example of the embodiment illustrated in FIG. 6A, the inflatable apparatus 10 measures approximately 900 mm from bonded edge 26a to the opposing bonded edge 26b. The bonded edge 26 will be between 30 mm and 50 mm wide. The outer holding surface 42a, adjacent bonded edge 26b, on first surface 22 is located 200 mm from bonded edge 26a. The angle φ formed between first surface 22 and outer holding surface 42a, adjacent bonded edge 26b, is 30°.

Figure 6B:
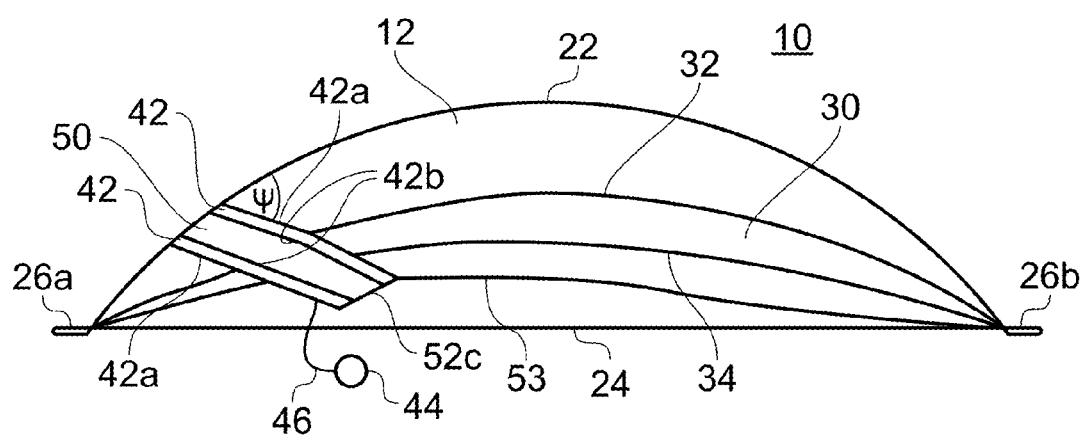
FIG. 6B is a cross-sectional view from the side of an inflatable apparatus according to a fourth embodiment of the present invention.

With reference to FIG. 6B there is shown a fourth embodiment of inflatable apparatus 10. As can be seen, in this embodiment, the holding portion 40 is arranged such that a device (not shown) retained within the holding portion 40 will project in a direction away from the rise of the curve of the arc of first surface 22. In this embodiment, the inflatable body is shown to be provided with a second inflatable portion 30. The second inflatable portion 30 is defined by third surface 32 and a fourth surface 34 which are bonded together between first surface 22 and second surface 24 at bonded edge 26 to provide an airtight inflatable portion 30. The second inflatable portion 30 is located within the first inflatable portion 20. The third surface 32 substantially defines and arc, the fourth surface 34 is substantially planar and lies parallel to and adjacent second surface 22. Holding aperture 50 has an aperture wall 52 defined through first surface 22, through an appropriately shaped aperture (not shown) defined between the third surface 32 and fourth surface 34 before terminating at interior end 52c. A holding portion 40 extends along holding aperture 50 into the inflatable body 12 from first surface 22 terminating at third surface 32. The holding portion 40 is bounded by a holding surface 42 with outer holding surface 42a affixed to aperture wall 52. The holding portion 40 is inflatable and is connected to a hand pump 44 by tube 46. Aperture wall 52 extends beyond the extent of holding portion 40 to between fourth surface 34 and second surface 24. Interior end 52c of aperture wall 52 acts to retain a device (not shown), when inserted into holding aperture 50 from first surface 22, so that during use, the device is positioned more accurately. To aid in retaining the positioning of the device when inserted into the aperture 50, interior end 52c is provided with a tether 53 which is attached at one end to interior end 52c with the other end of the tether 53 secured at bonded edge 26. Furthermore, the corrugated profile of aperture wall 52 acts to provide a cushioning effect when pressure is applied at the first surface 22 to a device (not shown) retained in holding portion 40

The holding surface 42 is adapted such that, upon inflation, frictional engagement occurs with a device (not shown), such as a dildo, inserted into the holding aperture 50 at the first surface 22. As the holding portion 40 is adjustable, the apparatus 10 will be able to accommodate devices of various cross-sectional diameters and shapes.

Figure 7:
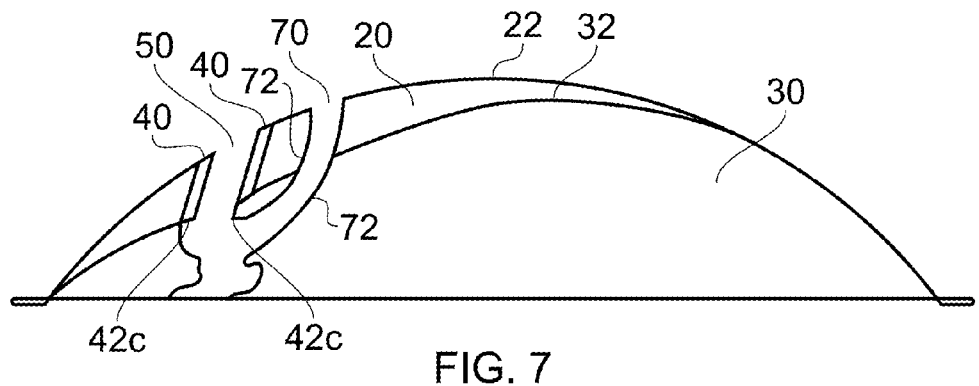
FIG. 7 is a cross sectional view from the side of an inflatable apparatus according to a fifth embodiment of the invention.

FIG. 7 illustrates a fifth embodiment of the inflatable apparatus 10. In this embodiment, the inflatable apparatus 10 is further provided with an access aperture 70 having an aperture wall 72 which defines an annular cylinder which connects to the interior end 42c of the holding portion 40 providing access therethrough. This embodiment of the inflatable apparatus 10 will be of particular use with electrically powered toys (not shown) provided with control mechanisms such as buttons or switches. When such a toy is inserted into the holding portion 40, the control mechanism would be arranged at interior end 42c of the holding portion. The access aperture 70 allows a user to insert there fingers into the inflatable apparatus 10 such that the control mechanisms of the toy can be adjusted during use of the toy (not shown).

Figure 8:
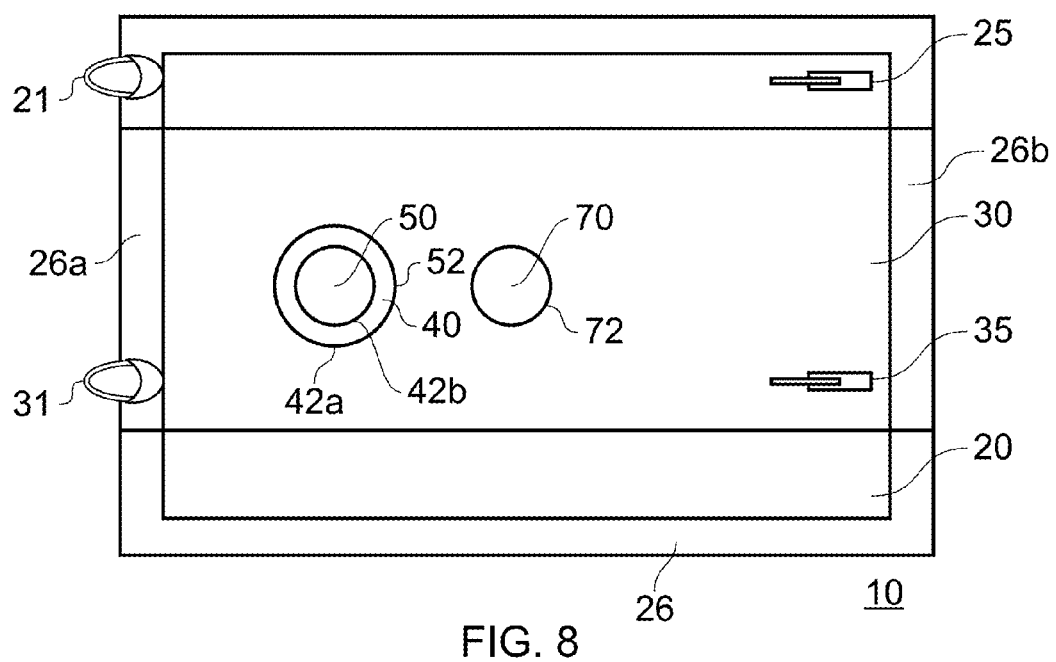
FIG. 8 is a cross sectional plan view of the inflatable apparatus shown in FIG. 7.

With reference to FIG. 8 there can be seen a plan view of the inflatable apparatus 10 of FIG. 7. The access aperture 70 is provided adjacent holding aperture 50.

Figure 9:
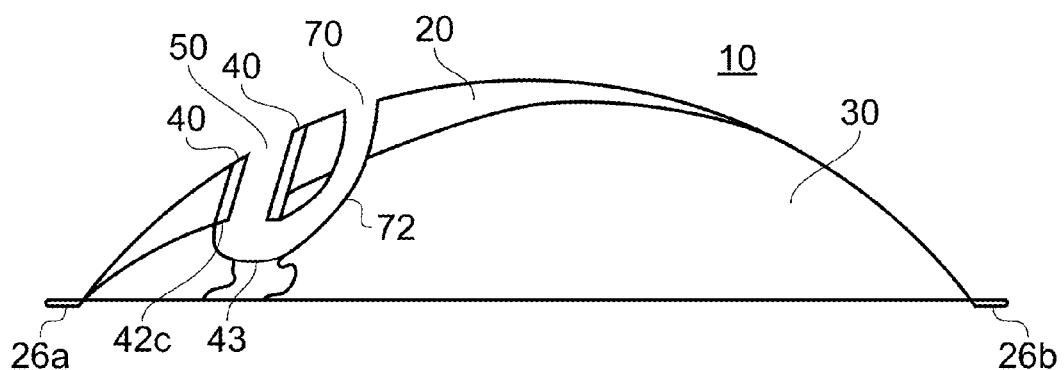
FIG. 9 is a cross sectional view from the side of an inflatable apparatus according to a sixth embodiment of the invention.

With reference to FIG. 9, it can be seen that in a further embodiment, an inflatable apparatus 10 provided with an access aperture 70 is provided with a retention surface 43 which extends across the holding aperture 50 beyond point where the aperture wall 72 forms a connective passage with the interior end 42c of the holding portion 40. This embodiment of the inflatable apparatus 10 will be of particular use to retain toys (not shown) of a slim diameter or malleable construction which are provided with control mechanisms which could otherwise slip past the corrugations of aperture wall 52 and exit from the apparatus 10 prior to the holding portion 40 being inflated to ensure frictional engagement is achieved.

It will be appreciated that whilst the access aperture 70 has been shown in FIGS. 7 and 8 as being located towards the centre of the inflatable apparatus, it could be arranged in any suitable position with another example being the access aperture 70 arranged between the holding aperture 50 and the bonded edge 26*a*.

It will be appreciated that whilst the access aperture 70 has been illustrated included in the inflatable apparatus as shown in FIG. 1, the access aperture could similarly be provided on the embodiments of the inflatable apparatus shown in FIG. 6.

Various modifications may be made to the embodiments hereinbefore described without departing from the scope of the invention. For example it will be appreciated that the inflatable apparatus 10, which has been detailed as having a rectangular footprint in the embodiments above, may have any suitable footprint. In addition, the inflatable apparatus 10 may be of any suitable dimension for the environment in which it is to be used e.g. an inflatable apparatus 10 designed for attachment to and use on a seat will be of a smaller size than an inflatable apparatus 10 designed for attachment to and use with a pillow. The inflatable apparatus 10 may have strapping or fastening equipment which is used to secure the apparatus to the chosen surface for use, the fastening equipment may be separate to, or integral with, the inflatable apparatus. The fastening equipment may include, but not be limited to, straps, Velcro®, webbing, studs or clips. Alternatively, the inflatable apparatus 10 may be a "stand alone" product which can be used without any strapping or securing. Furthermore, whilst the above embodiments have detailed the holding portion 40 as having a circular cross-section, it will be appreciated that the holding portion 20 may have any other suitable cross-sectional shape including, but not limited to, square, rectangular, triangular or oval. Similarly, the holding portion 40 has been detailed as being substantially tubular however it may have any suitable three dimensional shape including, but not limited to, a conical or tapering shape. The inflatable body 12 has been illustrated as having a first inflatable portion 20 within which is located a second inflatable portion 30. However, it will be understood that the inflatable body 12 may be provided with only a first inflatable portion 20. Alternatively, the first inflatable portion 20 may be provided with more than one additional inflatable portion should a different internal support structure be desired. The embodiments above include both main valves 21, 31 and fine tuning valves 25, 35 however it will be understood that the inflatable portions 20, 30 may be provided with only main valves 21, 31 without substantial detriment to the performance of the apparatus 10. Furthermore, although the example provided in FIG. 4 shows toy 60 being received within the holding aperture 50, the article being received by the inflatable apparatus could be a decorative article for display such as, for example an ornament. Alternatively, the article received could be a child's toy, in particular a toy for a child who is too young to hold the toy unassisted. Alternatively, the article being received could be a lamp or torch to be used in a hands-free manner. The inflatable apparatus could further be used to retain a drinking cup, such as a child's drinking cup, and used in an environment where it is desirable that the cup is held in a stabilised manner, for example, in a car or when at a restaurant. By placing the cup in holding portion 40, the drink may be held steady whilst the contents are drunk through a straw.

In addition, whilst the embodiment of FIG. 6B shows that the holding portion is bounded by interior end 52*c* which is provided with a tether 53, attached at one end to interior end 52*c* with the other end of the tether 53 secured at bonded edge 26 any of the embodiment detailed here within may be provided with these features.

The invention claimed is:

1. An inflatable apparatus comprising:
    a first inflatable portion which serves as a main structural element of the inflatable apparatus;
    a second inflatable portion serving as a secondary structural element of the inflatable apparatus;
    an inflatable holding portion which extends into or through the first inflatable portion and substantially through the second inflatable portion, the holding portion defining a holding aperture bounded by a holding surface, the holding surface being adapted for frictional engagement with a device inserted into the holding aperture, wherein the holding portion is adjustable such that such frictional engagement can be adjusted,
    the holding portion being inflatable independently of the first inflatable portion and the second inflatable portion; and
    an interior tether for retaining the positioning of an object inserted into the holding aperture, the tether being attached to the holding portion;
    wherein the second inflatable portion is inflatable independently of the first inflatable portion and the holding portion.

2. The inflatable apparatus as claimed in claim 1 wherein the holding portion is substantially tubular.

3. The inflatable apparatus as claimed in claim 2 wherein at least one part of the substantially tubular holding portion is provided with substantially planar walls.

4. The inflatable apparatus as claimed in claim 1 further comprising at least one valve to facilitate inflation and deflation.

5. The inflatable apparatus of claim 4, wherein the first inflatable portion is provided with a fine tuning valve for varying a desired cushioning effect of the first inflatable portion.

6. The inflatable apparatus as claimed in claim 1, further comprising at least one valve to facilitate inflation and deflation of the first inflatable portion.

7. The inflatable apparatus as claimed in claim 1 wherein the holding portion is provided with a hand activated pump to facilitate selective inflation and deflation.

8. The inflatable apparatus as claimed in claim 1 further comprising a holding surface that extends across the holding aperture at an inner edge region of the holding portion, the holding surface being adapted to retain flexibly, in at least one direction, a device inserted into the holding aperture.

9. The inflatable apparatus as claimed in claim 1 wherein the second inflatable portion is provided with at least one valve to facilitate inflation and deflation.

10. The inflatable apparatus as claimed in claim 9 wherein the second inflatable portion is provided with at least one valve to facilitate inflation and deflation.

11. The inflatable apparatus of claim 9, wherein the second inflatable portion is provided with a fine tuning valve for varying a desired cushioning effect of the second inflatable portion.

12. The inflatable apparatus of claim 1, comprising a rectangular footprint.

13. The inflatable apparatus of claim 1, wherein the second inflatable portion is located within the first inflatable portion.

14. The inflatable apparatus of claim 1, further comprising an inflation tube for inflating the holding portion.

15. The inflatable apparatus of claim 1, the tether being attached to a peripheral bonded edge of the apparatus.

16. An inflatable apparatus comprising:
    a first inflatable portion which serves as a main structural element of the inflatable apparatus;

a second inflatable portion serving as a secondary structural element of the inflatable apparatus, the second inflatable portion being located within the first inflatable portion, a substantially tubular holding portion which extends into or through the first inflatable portion and substantially through the second inflatable portion, the holding portion defining a holding aperture bounded by a holding surface, the holding surface being provided for frictional engagement with an object inserted into the holding aperture, the holding portion being inflatable independently of the first and second inflatable portions, the inflation of the holding portion being adjustable such that such frictional engagement can be adjusted, and an interior tether for retaining the positioning of an object inserted into the holding aperture, the tether being attached to the holding portion;

the second inflatable portion being inflatable independently of the first inflatable portion and the holding portion.

* * * * *